Oct. 30, 1951  S. C. ROCKAFELLOW  2,573,360
ELECTRIC VALVE SEQUENCED MULTIFUNCTION TIMER
Filed Nov. 6, 1948

STUART C. ROCKAFELLOW
INVENTOR.

BY 
ATTORNEY

Patented Oct. 30, 1951

2,573,360

UNITED STATES PATENT OFFICE 2,573,360

ELECTRIC VALVE SEQUENCED MULTI-FUNCTION TIMER

Stuart C. Rockafellow, Farmington, Mich., assignor to Robotron Corporation, Detroit, Mich., a corporation of Michigan Application November 6, 1948, Serial No. 58,638

21 Claims. (Cl. 175—320)

TIMING SYSTEM

This invention relates to electric control apparatus, and has particular relation to an electric timing system for controlling the movement of resistance welding electrodes and controlling the supply of power from a source to the welding electrodes.

In resistance welding, using air or hydraulic operated welding machines, several timing functions are necessary to produce the desired result. As an example: the welding electrodes must be brought against the work with a predetermined pressure before the actual welding operation takes place. The time required for the electrodes to reach this position and have the pressure built up from the normally open position is usually called "squeeze" time and will hereinafter be referred to as such. When sufficient pressure has been built up at the electrodes, the passage of welding current is ready to start. In spot welding the flow of the welding current is continuous and the duration of the flow of current through the electrodes is called "weld" time. In pulsation welding, the corresponding weld period is broken into a series of on and off periods, of which the total is called "weld interval" time. The "on" periods are controlled by one timing means, and the "off" periods are controlled by other independent means. The "on" time during the weld interval is called the "heat" time and the "off" time during the weld interval time is called the "cool" time. At the completion of the weld time in the spot welder, or the weld interval time in the pulsation welder, it is often desirable to hold the electrodes together for a predetermined length of time in order to let the work congeal under pressure. This period of time is called the "hold" time. For single welds, the welding machine opens after the completion of the hold time to release the work. For repeat operation the same material may be welded again at a different spot and the time required to move the work to the different location in respect to the electrodes is controlled by the "off" time of the timing apparatus. At the completion of the off time, the sequence of operations starts again with the squeeze time. This operation continues until the operator releases the initiating means.

It is accordingly a principal object of this invention to provide a combination timing apparatus which will control accurately each of either the squeeze, weld, hold and off periods for spot welding, or the squeeze, weld interval, heat, cool, hold and off periods for pulsation welding, and which control the electrode movement and the energization of the welding current in air or hydraulically operated resistance welding machines, such a timing system to have a simplified method of construction and operation.

It is a further object of this invention to provide easily operated control mechanisms to predetermine the duration of each of the above mentioned timing functions.

Another object of this invention is to obtain the various timing functions with a minimum number of transformers, electric discharge devices and relays.

More specifically, it is an object of this invention to provide a combination spot and pulsation welding timer incorporating also squeeze, hold and off periods, which is widely adjustable and affords a high degree of accuracy in timing.

Figure 1:
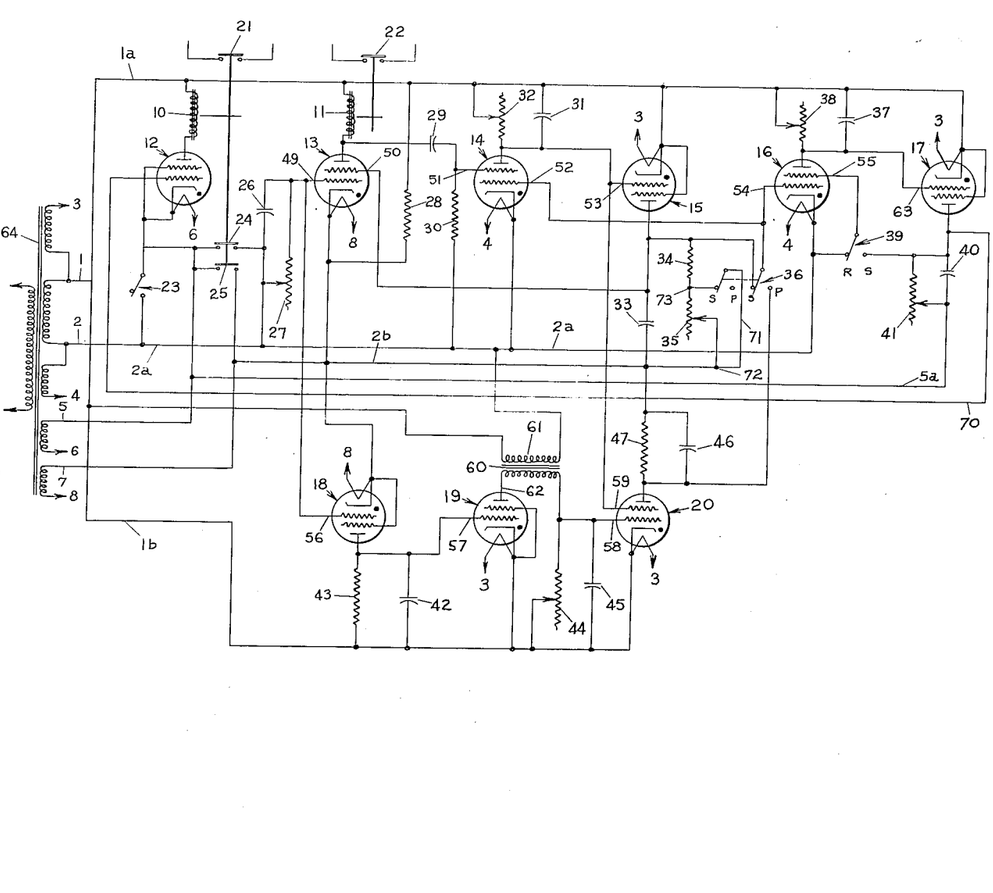

In accordance with this invention, the movement of the resistance welding electrodes is controlled in any conventional manner by the closing of the contacts 21 from the timing system. The flow of current through the welding electrodes is controlled in any conventional manner by the closing of contacts 22 which may actuate a mechanical contactor mechanism or initiate the firing of ignitrons.

Since such actuation means are all well known to the art, and may be such as are illustrated schematically in U. S. Patent No. 2,289,320, no further showing thereof here is necessary.

It will be appreciated, however, that although this timer circuit has been developed expressly for use with resistance welding equipment, its use is not so limited but it may be applied to any device wherein it is necessary to control a series of mechanical operations in some predetermined time sequence, particularly where such must be done with a high degree of accuracy involving timing in terms of cycles of current from standard alternating current commercial supply. Likewise, it will be appreciated that there are certain novel parts of the herein disclosed circuit which may be separated from the remainder thereof and applied to various uses independent of the purposes herein directly concerned.

In the present circuit, the major, or basic part is provided for spot welding control, but it is so adapted that by the actuation of a single switch, additional parts, comprising in all much less equipment than said basic part, are interlocked into said basic part and convert the device into one for pulsation welding control. The following description will deal first with said basic part and will accordingly describe the spot welding control function, and then will describe the pulsation welding control parts and function. Terminology and reference characters will generally follow the style appearing in Chute, "Electronic Control of Resistance Welding" (1943).

SPOT WELDING CONTROL

In the accompanying drawing, there is diagrammatically illustrated a particular circuit embodying the principles of this invention.

The conventional relay 10 actuates the contacts 21 to control the mechanical movement of the welding electrodes, as by a solenoid operating an air valve, in any ordinary manner. The relay 11 similarly actuates the contacts 22 which in turn control the flow of current to the welding electrodes in any ordinary manner. The switch 23 functions as a starting switch, as explained in detail below, and the double pole double throw switch 36 controls the selection of the spot welding or pulsation welding manner of operation. Switch 39 controls operation through a single cycle or effects automatic repeating.

Standard alternating current is supplied from any convenient power source to a transformer 64 which then supplies, by suitable and conventional leads, potential at desired levels to the various parts of the timing device. The electronic valves are generally of the thyratron type having two control grids each, and the several capacitors and resistors are of any of many standard types available. The sizes and specific characteristics of all of the several parts hereinafter mentioned will be readily apparent to anyone skilled in the art and hence details thereof need not be given.

In the improved timing circuit of this invention, a conventional source of alternating current is connected to the primary winding of the transformer 64 and thereby energizes the several secondary windings whose terminals are indicated by the numerals 1 to 8 inclusive.

The terminal 1 is connected to and energizes the first bus conductor 1a, and the terminal 2 is connected to and energizes a second bus conductor 2a which has a branch 2b. The switching circuit including the gas filled electric discharge device 12 is arranged between the first bus conductor 1a and the second bus conductor 2a and controls the relay indicated by the winding 10 and the contacts 21, 24 and 25. A switch 23 is arranged in the cathode circuit of the electric discharge device to control energization thereof.

A squeeze-time circuit includes the electric discharge device 13, having two control electrodes, which device is connected between the branch 2b of the second bus conductor 2a and the first bus conductor 1a. The first control electrode of said electric discharge device 13 is connected through a time constant circuit comprising the capacitor 26 and the variable resistance 27 to the second bus conductor 2a, and the cathode of said electric discharge device is also connected through the resistor 28 to the first bus conductor 1a.

A weld-time circuit includes the electric discharge device 14. Its cathode is connected to the second bus conductor 2a, and its anode is connected to the first bus conductor 1a through a time-constant circuit comprising the capacitor 31 and the variable resistor 32. Its first control electrode 51 is connected through a resistor 30 to the cathode of said electric discharge device 14 and is also connected through a capacitor 29 to the anode of the electric discharge device 13.

A connecting circuit includes the electric discharge device 15. Its cathode circuit is connected to the first bus conductor 1a and its first control electrode 53 is connected to the anode of the electric discharge device 14. The anode circuit is connected to the branch 2b of the second bus conductor through a time-constant circuit comprising the capacitor 33 and the resistor 34, the variable resistor 35 being shunted out by the conductor 71 when the portion of the switch 36 connected therewith is in the "S" position. The function and purpose of the variable resistor 35 will appear later.

The hold-time circuit includes the electric discharge device 16, whose anode is connected to the first bus conductor 1a by means including a time constant circuit comprising the capacitor 37 and the variable resistor 38. The cathode is connected to the second bus conductor 2a. The anode of the electric discharge device 15 is connected to the second control electrode 50 of the electric discharge device 13 and said anode is also connected, through the switch 36, both to the second control electrode 52 of the electric discharge device 14 and to the first control electrode 54 of the electric discharge device 16.

The off-time circuit includes an electric discharge device 17. It has means for connecting the cathode of said electric discharge device to the first bus conductor 1a and other means for connecting the anode of said electric discharge device through the conductor 70 to the control electrode of the first electric discharge device 12 and other means for connecting said anode through the time constant circuit comprising the capacitor 40 and variable resistor 41 through the conductor 5a and through the switch 23 to the second bus conductor 2a. Further means are provided for connecting the control electrode 63 of said electric discharge device 17 to the anode of electric discharge device 16.

A switch 39 and conductors associated therewith connects the second control electrode 55 of the electric discharge device 16 either to the cathode of said electric discharge device 16 or to the anode of the electric discharge device 17.

The connections of the various cathode filaments are indicated by common numerals at the cathode filaments and at the several secondary windings shown in connection with the transformer 64.

OPERATION OF SPOT WELDING CONTROL

For use of this timer system for spot welding control, switch 36 is thrown to spot S position, the switch 39 is in repeat R position and the starting switch 23 is in an open position at rest. With the power source now suitably connected to the transformer 64, the condition of the device is as described in the following three paragraphs.

With switch 36 in spot S position, only the discharge devices or electric valves 12, 13, 14, 15, 16 and 17 are used. Discharge device 12 is not conducting due to the open cathode circuit through switch 23. Discharge device 13 does not conduct due to the open cathode circuit furnished by switch 23 and relay contacts 24. The cathode of discharge device 13 is connected to its anode or 1 side of the line through resistor 28 of relatively high resistance, and provides a current flow to the grid 49 and through capacitor 26 to the opposite or 2 side of the line. This charges capacitor 26 by means of grid rectification to a negative potential at the grid end and positive at the line 2 end.

Discharge device 14 is conducting, charging capacitor 31 to a negative potential at the anode side and positive at the line 1 side. Discharge device 14 also simultaneously charges capacitor 29 through grid 51 to cathode conduction. Due to the rectifier action of the grid to cathode conduction, capacitor 29 is charged to a negative potential at the grid end.

Capacitor 31 is charged to a negative potential at the anode side and this same point is connected to the grid of discharge device 15. With the negative potential on the grid 53 of discharge device 15 the device is rendered non-conducting. Discharge device 16 is conducting, charging capacitor 37 to a negative potential at the anode side. Control device 17 is not conducting due to the open anode circuit to line 2 through switch 23 or relay contact 24.

With switch 39 in repeat R position, the operation of the timing system starts with the closing of initiating switch 23 which completes the cathode circuit of discharge device 12. When discharge device 12 conducts, relay 10 is energized, closing the contacts 21, 24 and 25. Contacts 24 are used to lock in the relay 10 through its own contacts. Contacts 25 complete the cathode circuit of discharge device 13 to line 2 and also places the anode supply to discharge device 15 to line 2 source.

Inasmuch as capacitor 26 has been previously charged to a negative value at the grid end by the above mentioned cathode to grid conduction of discharge device 13, the latter will remain non-conductive even after the closing of said contacts 25. However, with the cathode now connected to the 2 side of the line through substantially no resistance, although it remains also connected to the 1 side of the line through the relatively high resistance 28, said cathode will reverse its polarity with respect to the grid 49, which is also connected to the 2 side of the line. This terminates the cathode to grid flow and terminates the charging of the capacitor 26. Thus, excepting for the negative charge already on the grid 49 and held so by the charged capacitor 26, the discharge device 13 would conduct. The capacitor, of course, immediately commences to drain through the variable resistance 27 and the time required to drain to a sufficiently low level to permit the discharge device 13 to conduct governs the squeeze time.

When discharge device 13 conducts, relay 11 becomes energized, closing contacts 22, initiating the current flow to the welding electrodes, starting the weld time. Charging of capacitor 29 has previously been through grid to cathode conduction of discharge device 14, with one side of capacitor 29 connected to the grid 51 and the other side connected to the anode of discharge device 13 and through the relay 11 to the 1 side of the line. When discharge device 13 conducts, its anode effectively becomes at line 2 potential, due to the low arc drop of discharge device 13, which removes the charging potential to capacitor 29. This places the negative potential of capacitor 29 directly on the grid of discharge device 14, rendering said device non-conductive as soon as weld time starts.

As soon as discharge device 14 is rendered nonconductive, capacitor 31 is no longer being charged and can drain, through variable resistance 32 to a low enough potential to allow discharge device 15 to conduct. The time of discharge of capacitor 31, governed by variable resistance 32 to that value which allows discharge device 15 to conduct is the weld time. When discharge device 15 conducts, capacitor 33 charges to a negative potential at the anode side. The conduction of discharge device 15 accomplishes three results. Immediately when capacitor 33 is charged, a high negative potential is placed on one of the grids of discharge device 13 thereby rendering it non-conductive, and also placing the same high negative potential on the grids of discharge devices 14 and 16 rendering both these discharge devices non-conductive. When discharge device 14 is rendered non-conductive, any source of negative potential to the grid of discharge device 15 is removed, making discharge device 15 conduct for as long as an anode to cathode potential remains.

By the termination of conduction through discharge device 13, the relay 11 is released and the contacts 22 are opened, thus ending the weld period. However, with the discharge device 12 still conducting, the relay 10 is still actuated and the contacts 21 are still closed, thus still holding the electrodes against the work. Thus the hold time commences.

When discharge device 15 conducts, the high negative potential of charged capacitor 33 is also imposed on the grid 54 of discharge device 16 rendering said device non-conductive, allowing capacitor 37 to drain through variable resistor 38, which governs the time of discharge. When capacitor 37 drains to a low enough potential, as imposed on grid 63 of discharge device 17, said discharge device conducts charging capacitor 40 to a high negative potential at the anode side. This side is also connected to the grid of discharge device 12, which renders said discharge device non-conductive. This de-energizes relay 10 and thereby opens the contacts 21, 24 and 25. This opening of contacts 21 terminates the pressure on the electrodes in any conventional manner and they retract, thus ending the hold period and initiating of the off period. Opening of contacts 25 removes the potential supply to discharge device 15, thus rendering that discharge device non-conductive, which allows discharge devices 14 and 16 to conduct. As discharge device 16 conducts, capacitor 37 is charged, placing a high negative potential on the grid of discharge device 17 rendering that device non-conductive. This removes the charging source from capacitor 40 which then discharges through variable resistor 41, governing off time, to such a low value as to allow discharge device 12 to again conduct. When discharge device 12 again conducts, relay 10 becomes energized and the sequence starts again.

For single operation, the switch 39 is thrown to single S position. Switch 23 is initiated as before, and the sequence of operation remains the same up to the point that discharge device 17 begins conduction. As discharge device 17 conducts, a high negative potential is placed on both the grids of discharge devices 12 and 16 rendering them non-conductive for as long as discharge device 17 conducts. With discharge device 16 non-conducting, discharge device 17 will conduct as long as an anode to cathode potential exists. This potential remains as long as the switch 23 remains closed. As switch 23 is opened, potential source to discharge device 17 is removed, through line 5 to line 2. After capacitor 40 drains to a low enough value, discharge device 16 will conduct and the system is ready for re-initiation. However, the opening of said switch 23 interrupts the supply through the second bus conductor 2a and its branch 2b so that the system remains inactive until said switch is again closed and another, similarly single, cycle is thereby initiated.

DESCRIPTION OF PULSATION WELDING CONTROL

The circuit involving the electric discharge devices 18, 19 and 20, when connected, converts the foregoing described apparatus into a pulsation welding device, wherein a plurality of properly timed pulses may be effected as desired in the conductor, as a welding circuit, after which other suitably timed operations may be effected, as the hold and off timing of a welding sequence.

As illustrated in the drawing, a second branch 1b of the first bus conductor 1a extends from the connection 1 of one of the secondary windings of the transformer 64. The electric discharge device 18 has its cathode energized by connection to the branch 2b of the bus conductor 2a and its anode is connected through a time constant circuit comprising the capacitor 42 and the resistor 43 to the second branch 1b of the first bus conductor. The control electrode 56 of electric discharge device 18 is connected to the control electrode 49 of the electric discharge device 13.

The electric discharge device 19 has its cathode connected to the second branch 1b of the first bus conductor and its control electrode 57 connected to the anode of the discharge device 18. A transformer 60 has its primary winding 61 connected between the first bus conductor and the second bus conductor, here the second branch 1b of the first bus conductor and the first branch of the second bus conductor 2a. Its secondary winding is connected at one side thereof to the anode 62 of the discharge device 19 and its other side is connected through the time constant circuit comprising the variable resistor 44 and the capacitor 45 to the second branch 1b of the first bus conductor. The purpose of this structure will be set forth hereinafter, inasmuch as it will be better understood after the operation of the apparatus is described.

The electric discharge device 20 has its cathode connected to the second branch 1b of the first bus conductor, one control electrode 58 connected through the time constant circuit comprising the variable resistor 44 and the capacitor 45 also to the second branch 1b of the first bus conductor, and a second control electrode 59 connected to the control electrode 53 of the electric discharge device 15. The anode of said electric discharge device 20 is connected to the terminal "P" of the switch 36 and is also connected through the time constant circuit comprising the capacitor 46 and the resistor 47 to the branch 2b of the second bus conductor.

As in the portions of the apparatus described above, the connections for the filaments of each of the cathodes of the above mentioned electric discharge devices are indicated by common numerals adjacent one terminal of each of said filaments and at several of the secondary windings of the transformer 64.

OPERATION OF PULSATION WELDING CONTROL

For pulsation operation, switch 36 is thrown to pulsation P position, thereby adding discharge devices 18, 19 and 20 to the timing system and adding the variable resistor 35 to the resistor 34 in the time constant circuit between the anode of discharge device 15 and the branch 2b of the second bus conductor. At rest, discharge device 18 is non-conductive, as explained below discharge device 19 is conducting charging capacitor 45 which places a high negative potential on the grid 58 of discharge device 20 rendering that device non-conductive.

In pulsation operation, the grids of discharge devices 14 and 16 which in spot operation were connected to the anode of discharge device 15, are now connected to the anode of discharge device 20.

As switch 23 is initiated, discharge device 12 conducts, energizing relay 10 which closes contacts 21, 24 and 25. As before, when contacts 25 close, the cathode of discharge device 13 is placed at line 2 potential, thus reversing its polarity and making the discharge device 13 ready to conduct as soon as the negative charge on the grid 49, caused by the charge on capacitor 26, drains off through the variable resistor 27. In this situation, however, the capacitor 26 also effects a similar negative charge on the grid 56 of discharge device 18 and thus renders it non-conductive for the same period of time.

When capacitor 26 drains to a low enough value, discharge devices 13 and 18 conduct, ending the squeeze time. As discharge device 13 conducts, relay 11 becomes energized, closing contacts 22, starting heat time, as in the spot welding operation. As discharge device 18 conducts, capacitor 42 is charged to a high negative potential at the anode end, which is also placed on the grid 57 of discharge device 19 rendering it non-conductive. As discharge device 19 become non-conductive, capacitor 45 now starts draining through variable resistor 44 governing weld interval time. When capacitor 45 drains to a low enough value, discharge device 20 will conduct, depending upon the condition of grid 59 to be explained later.

As discharge device 13 conducts, and starts a welding period as above described, the anode is effectively placed at cathode potential due to the low arc drop of the device, thus removing the positive half cycles as a potential source to charge capacitor 29 through grid-cathode conduction of discharge device 14. Then as discharge device 13 conducts, a high negative potential is placed on the grid 51 of discharge device 14 with respect to its cathode, rendering discharge device 14 non-conductive and removing the charging source to capacitor 31. The time of discharge of capacitor 31 is governed by variable resistance 32 which controls the heat time. When the potential across capacitor 31 reaches a low enough value on the grid of discharge device 15, this device conducts, charging capacitor 33 to a high negative potential at the anode side.

This high negative potential is also placed on the grid 50 of discharge device 13 rendering that device non-conductive, de-energizing the relay 11, opening the contacts 22 and ending heat time. As discharge device 13 stops conduction, capacitor 29 becomes charged by a path through relay 11 to the 1 side of the line, and charging by grid-cathode conduction of discharge device 14. Because grid 51 is now effectively connected to the first bus conductor 1 or its anode side of the line, discharge device 14 conducts, charging capacitor 31 which places a high negative potential on the grid 53 of discharge device 15, rendering that device non-conductive. This removes the charging source of capacitor 33. Capacitor 33 may now discharge through the variable resistance 35 due to the opening of the shunt 71 by the shifting of the switch 36 from its "S" to its "P" position, and fixed resistor 34, and the timing is in the cool period. When the potential across capacitor 33 reaches a low enough value, discharge device 13 again conducts. This ends the cool time and starts a new heat-cool sequence.

During the heat-cool times, the duration of each heat and cool time is governed by the resistance across the heat time capacitor 31 and the cool time capacitor 33.

Meanwhile, during the heat-cool times, the weld interval capacitor 45 has been draining to a lower potential. When a low enough potential is reached, discharge device 20 will conduct if conditions are correct on its other grid 59. If there is a high enough potential across the heat time capacitor 31 when the weld interval capacitor 45 has drained to a low enough potential to ordinarily allow discharge device 20 to conduct, then discharge device 20 will still not conduct until the heat time is complete. When both these conditions are correct, namely, when both the capacitor 31 and capacitor 45 are both drained, discharge device 20 will conduct. This charges capacitor 46 and places a high negative potential at the anode end and on the grids of discharge devices 14 and 16, rendering them non-conductive. As discharge device 14 is non-conductive, discharge device 15 can now conduct as long as the anode cathode supply exists through contacts 25. With discharge device 15 conducting, a high negative potential is at the anode end of capacitor 33 and placed on the grid 50 of discharge device 13 rendering that device non-conductive.

As discharge device 16 is rendered non-conductive, by the high negative potential from capacitor 46, the hold time capacitor 37 has its charging source removed and can drain through the variable resistance 38 to such a low value as to allow discharge device 17 to conduct.

With the conduction of discharge device 17, a high negative potential from capacitor 40 is placed on the grid of discharge device 12 rendering that device non-conductive, which releases relay contacts 21, 24 and 25, as with the repeat spot welding operation above described and for the same purposes. The off time is similarly controlled by the capacitor 40 and when it is drained the cycle starts again, as previously explained.

To prevent excessive filament to cathode potential, separate filament windings are used to supply each group of discharge devices having their cathodes at a common point.

A useful characteristic of the smaller type thyratron or gas-filled discharge devices is that when the anode potential is lowered, the grid control characteristic potential is also lowered, thus compensating for wide supply potential variations. By having the grid potential vary to somewhat the same extent as the anode potential, the timing accuracy remains substantially the same regardless of voltage supply variations to the timing system.

Transformer 60 is used as a phasing device in order to bring the cathode of discharge device 20 to the 1 side of the line. By doing this the cathode of discharge device 19 can follow the natural sequence of operation in respect to lines 1 and 2, having its cathode going to the 1 side of the line and putting discharge device 20 in such a phasing position as to be able to have the anode capacitor 46 go to the 2 side of the line through line 7 and contacts 25, in order to render discharge devices 14 and 16 non-conductive when capacitor 46 is charged.

Although only a single specific embodiment of the invention has been described in detail, it will be appreciated that various further modifications in the form, number and arrangement of parts may be made without departing from the spirit and scope thereof.

What is claimed is:

1. Electric timing control apparatus for connection to a source of alternating potential and having first and second bus conductors of opposite polarity, the combination comprising: a first circuit including a first electric discharge device and a load in series between said conductors, the anode of said first electric discharge device being connected to the first bus conductor and its cathode being connected to the second bus conductor and said load being on the anode side of said first electric discharge device; a second circuit including a second electric discharge device and a first capacitor in series between said conductors, in the same polarity as said first circuit, said capacitor being on the anode side of said second electric discharge device, and a first resistor in shunt relationship with said capacitor; a control electrode in said second discharge device, a second capacitor and means connecting said control electrode through said second capacitor to the anode of said first discharge device; means to be controlled including a third electric discharge device and a conductor connecting the control electrode thereof to the anode of said second discharge device; switch means controlling the application of potential to said first electric discharge device and means controllably energizing the control electrode thereof; a second resistor connecting the control electrode of the second electric discharge device to the cathode circuit thereof; whereby when said first electric discharge device is not conducting conduction through the last named resistor will charge the said first capacitor, said second electric discharge device will conduct and said third electric discharge device will be blocked, and when said electric discharge device becomes conducting the charge on at said capacitor will impose a potential on the control electrode of the second discharge device to effect blocking thereof and thereby to terminate the blocking of said third electric discharge device after a time delay determined by the said first capacitor and first resistor.

2. In a timing circuit connectible to a source of alternating potential and including a pair of bus conductors of opposite polarity, the combination comprising: a first circuit including a gas filled electric discharge device having an anode, a cathode, and a first control electrode and means connecting the cathode thereof to one of said conductors and a first capacitor and a resistor in parallel with each other and means connecting one end of said capacitor and resistor circuit to the anode of said electric discharge device and the other end thereof to the other of said pair of conductors; means controlled by said circuit including a second control electrode; a conductor connecting said last named control electrode to the anode of said electric discharge device; a second circuit including a load connecting said conductors and a switch included therein between said load and that one of said conductors connected to the cathode of said electric discharge device; a second capacitor and means connecting one side of only said capacitor with the control electrode of said electric discharge device and means connecting the other side of only said capacitor to said second circuit at point between said switch and said load, a second resistor and means connecting one end thereof directly to the cathode circuit of said electric discharge device and means connecting the other end thereof to a point between said control electrode and second capacitor; whereby when said switch is open conduction of current through said electric discharge device by grid to cathode conduction will charge said capacitor to a polarity which will not block conduction of said electric discharge device but closing of said switch will cause said capacitor to impose a potential on said control electrode capable of blocking said electric discharge device.

3. Electric timing control apparatus for connection to a source of alternating potential and having first and second bus conductors of opposite polarity, the combination comprising: a first circuit including a first electric discharge device and a load in series between said conductors, the anode of said first electric discharge device being connected to the first bus conductor and its cathode being connected to the second bus conductor and said load being on the anode side of said first electric discharge device; a second circuit including a second electric discharge device and a first capacitor in series between said conductors, in the same polarity as said first circuit, said capacitor being on the anode side of said second electric discharge device and a first resistor in shunt relationship with said capacitor; a primary control electrode in said second discharge device, a second capacitor and means connecting said primary control electrode through said second capacitor to the anode of said first discharge device; means to be controlled including a third electric discharge device and a conductor connecting the control electrode thereof to the anode of second discharge device; switch means controlling the application of potential to said first electric discharge device and means controllably energizing the control electrode thereof; a second resistor connecting the control electrode of the second electric discharge device to the cathode circuit thereof; whereby when said first electric discharge device is not conducting conducton through the last named second electric discharge device by grid to cathode conduction will charge the said second capacitor and said second electric discharge device will conduct and said third electric discharge device will be blocked, and when said first electric discharge device becomes conducting the charge on at said second capacitor will impose a potential on the control electrode of the second discharge device to effect blocking thereof and thereby to terminate the blocking of said third electric discharge device after a time delay determined by the said first capacitor and first resistor, means connecting said third electric discharge device between said bus conductors in reverse polarity with respect to the first and second electric discharge devices and having a capacitor in the anode circuit thereof and a resistor in parallel with said last named capacitor; a second control electrode in each of said first and second electric discharge devices; means connecting the anode of said third electric discharge device to the second control electrode in said first electric discharge device; means also providing connection between the anode of said third electric discharge device to the second control electrode of the second electric discharge device; whereby conduction of said third electric discharge device will effect blocking of the first and second electric discharge devices for so long as the anode circuit of said third electric discharge device remains energized.

4. Electric timing control apparatus for use with an alternating source of potential as defined in claim 1, including also: fourth, fifth, and sixth electric discharge devices each having an anode, a cathode and a control electrode comprising a bridging circuit; a conductor connecting the cathode of said fifth electric discharge device to the said second bus conductor; a conductor connecting the control electrode of said fifth electric discharge device to the control electrode of the first electric discharge device, a third bus conductor connected to the first bus conductor, a resistor and capacitor in parallel with each other and connected at one of their respective ends to the anode of said fifth electric discharge device and the other of their respective ends to the third bus conductor; a conductor connecting the cathode of the sixth electric discharge device to the third bus conductor, a conductor connecting the control electrode of said fifth electric discharge device to the anode of said fourth electric discharge device and phase reversing means imposing potential between the anode and cathode of said fifth electric discharge device simultaneously with the imposition of potential onto said first and second bus conductors; a capacitor and resistor in parallel circuit with each other and means connecting one end of said parallel circuit to said last named anode and the other end of said parallel circuit of the last named cathode; means connecting the cathode of the sixth electric discharge device to said third bus conductor a switch interposed in the circuit between the anode of said third electric discharge device and the second control electrode of the second electric discharge device; means connecting the anode of said sixth electric discharge device to said last named switch whereby said last named control electrode may be energized selectively from the anode circuit of either the third electric discharge device or of the sixth electric discharge device; a resistor and capacitor in parallel with each other and means connecting one end of said parallel circuit to the anode of said sixth electric discharge device and the other end of said parallel circuit to said second bus conductor; means connecting one control electrode in said sixth electric discharge device to the second control electrode of said third electric discharge device and means connecting the other control electrode therein to the anode circuit of said fifth electric discharge device.

5. In a timing control means for a welding machine, including a plurality of electric discharge devices, each having a cathode, an anode and a control electrode, the combination with a source of alternating potential and first and second bus conductors alternately energized thereby in opposite polarity said second bus conductor having first and second branches, a first electric discharge device energized from said source and a four-pole relay controlled thereby, one pair of poles of said relay being interposed into said second branch of said second bus conductor, a fifth electric discharge device connected between said first bus conductor and the first branch of said second bus conductor with the cathode thereof connected to said last-named conductor and a resistor and capacitor connected in parallel in the anode circuit thereof, a sixth electric discharge device and means connecting its cathode with said first bus conductor, means connecting the anode of the fifth electric discharge device to the control electrode of the sixth electric discharge device, means connecting the anode of the sixth electric discharge device to the control electrode of the first electric discharge device and independent means including a capacitor and resistor in parallel connecting the anode of said sixth electric discharge device through a starting switch to the same side of said source as that to which the second bus conductor is connected, of a net work interposed between and associated with said first electric discharge device and said fifth and sixth electric discharge device, comprising: a second, electric discharge device having first and second control electrodes, and means including the winding of a relay connecting the anode thereof to said first bus conductor; means connecting the cathode of said second electric discharge device to said second branch of said second bus conductor; means including a resistor and capacitor in parallel connecting said first control electrode of said second electric discharge device to said first branch of said second bus conductor and a conductor including a resistor of relatively high value connecting the cathode of said second electric discharge device with the first bus conductor; a third electric discharge device, having first and second control electrodes, and means including a resistor and capacitor in parallel connecting its anode with the first bus conductor, means connecting its cathode to the first branch of the second bus conductor, means connecting its first control electrode through a resistor to said second bus conductor and other means connecting said control electrode through a capacitor to the anode of said second electric discharge device; a fourth electric discharge device and means connecting its cathode to the first bus conductor, means including a capacitor and resistor in parallel connecting its anode to said second branch of said second bus conductor and means connecting its control electrode to the anode of said third electric discharge device; a connector between the anode of said fourth electric discharge device and the second control electrodes of both of said second and third electric discharge devices; and a connector from the anode of said fourth electric discharge device to the control electrode of said fifth electric discharge device.

6. In a timing control including a plurality of electric valves each having an anode, a cathode and a control electrode, and including a controlling conductor and means to be controlled which are responsive to energization and deenergization of said controlling conductor, the combination: a source of alternating potential; means including a first valve energized from said source controlling the application of potential to the remainder of the device; a second valve having two control electrodes and means connecting the anode of said second valve to a first side of said source; means connecting the cathode of said second valve to a second side of said source; and means controlled by said first valve controllably energizing one control electrode of said second valve; a third valve having two control electrodes, means including a capacitor and resistor in parallel connecting its anode to the first side of said source and means connecting its cathode to the second side of said source; a capacitor and a resistor and means connecting the anode of the second valve through said capacitor to one control electrode of said third valve and means connecting said control electrode through said resistor to the second side of said source; a fourth valve having its cathode connected to said first side of said source, a resistor and capacitor in parallel and means connecting the anode of said fourth valve through said resistor and capacitor to the second side of said source; means connecting the anode of said fourth valve to the other control electrode of the said second valve and to said controlling conductor; further time delay means initiated as an independent sequence simultaneously with the conduction of said second valve and including connection with said controlling conductor and with said other control electrode in said third valve for energizing each thereof upon expiration of a predetermined time which is independent of the time periods controlled by the above designated capacitors, resistors and means associated therewith; whereby the said winding may be repeatedly energized for predetermined periods each and a series of such repeated energizations effected for a predetermined time, after which such repeated energizing of said winding will be terminated and the said means to be controlled are caused to act.

7. The combination claimed in claim 12 wherein said further time delay means includes a seventh electric discharge device and means connecting its cathode to said second side of said source, means including a capacitor and resistor in parallel connecting its anode to said first side of said source and means connecting its control electrode to the control electrode of said second electric discharge device; an eighth electric discharge device and means connecting its cathode to said first side of said source, means including phase inverting means connecting its anode to the second side of said source, a capacitor and a resistor in parallel being included in said anode circuit, means connecting its control electrode to the anode of said seventh electric discharge device; and a ninth electric discharge device having two control electrodes, means connecting its cathode to the said first side of said line, means including a capacitor and a resistor in parallel connecting its anode to said second side of said source, means connecting one control electrode to the anode circuit of said seventh electric discharge device at a point between said phase inverting means and said last-named capacitor and resistor, means connecting the other control electrode to the second control electrode of said fourth electric discharge device and means connecting the anode of said ninth electric discharge device to the second control electrode in said third electric discharge device and to control electrode of said fifth electric discharge device; and means breaking the connection between the anode of said fourth electric discharge device and said second control electrode of said third electric discharge device and said control electrode of said fifth electric discharge device; whereby the said winding may be repeatedly energized for predetermined periods each and a series of such repeated energizations effected for a predetermined time after which such repeated energizing of said winding will be terminated and said means to be controlled will be caused to act.

8. In electric timing control apparatus for connection to a source of alternating potential, the combination comprising: first and second bus conductors and means connectible to said source energizing said bus conductors in opposite polarities; a first circuit including a first electric discharge device connected between said conductors, the anode of said first electric discharge device being connected to the first bus conductor and the cathode thereof being connected to the second bus conductor; a second circuit including a second electric discharge device and means providing a time-constant circuit connected in series between said conductors, said electric discharge device being in the same polarity with respect to said conductors as said first electric discharge device and said time-constant circuit being in the anode circuit of said second electric discharge device; a control electrode in said second electric discharge device, a capacitor and means connecting said control electrode through said capacitor to the anode of said first electric discharge device; switch means controlling conduction through said first electric discharge device; a resistor connecting the control electrode of said second electric discharge device to the cathode circuit thereof; an output conductor connected to the anode of said second electric discharge device.

9. In a timing circuit connectible to a source of alternating potential, the combination comprising: a first bus conductor and a second bus conductor, said second bus conductor being divided into first and second branches; a first electric discharge device connected to said first bus conductor by the anode thereof and having its cathode connected to the second branch of the second bus conductor; means including a relatively high resistance connecting the second branch of said second bus conductor to said first bus conductor; a switch in said second branch of said second bus conductor; means including a time-constant circuit connecting the control electrode of said first electric discharge device to the first branch of said second bus conductor; a second electric discharge device and means including a time constant circuit connecting the anode thereof to said first bus conductor and means connecting the cathode thereof to the first branch of said second bus conductor; means including a relatively high resistance connecting the control electrode of said second electric discharge device to the cathode of said second electric discharge device; a capacitor and means connecting one side thereof to the control electrode of said second electric discharge device and means connecting the other side thereof to the anode of said first electric discharge device; an output conductor connected to the anode of said second electric discharge device for connection to the means to be controlled by said timing circuit.

10. Electric timing control apparatus connectible to a source of alternating potential and having first and second bus conductors of opposite polarity, the combination comprising: a first circuit including a first electric discharge device between said bus conductors, and means connecting the anode thereof to said first bus conductor and means connecting the cathode thereof to said second bus conductor; a second circuit including a second electric discharge device having first and second control electrodes, and means including a time constant circuit for connecting the anode thereof to said first bus conductor and means connecting the cathode thereof to said second bus conductor, a capacitor and means connecting said first control electrode through said capacitor to the anode of said first electric discharge device; switch means controlling the application of potential to said first electric discharge device; means including a resistor connecting the control electrode of said second electric discharge device to the cathode circuit thereof; a third electric discharge device and means connecting the cathode thereof of said first bus conductor and means including a time constant circuit connecting the anode thereof to said second bus conductor, means connecting the control electrode thereof to the anode of said second bus conductor; a second control electrode in each of said first and second electric discharge devices and means connecting the anode of said third electric discharge device to each of said second control electrodes; or output conductor connected to the anode of said third electric discharge device; whereby conduction of said third electric discharge device will effect blocking of said first and second electric discharge devices.

11. Means as defined in claim 9 wherein said means to be controlled includes a fourth electric discharge device and said output conductor constitutes a connection from the anode of said third electric discharge device to the control electrode of said fourth electric discharge device.

12. In a timing control means, including a plurality of gas filled electric discharge devices, each having a cathode, an anode and a control electrode, the combination with means connectible to a source of alternating potential including first and second bus conductors alternately energized by said source in opposite polarity, and said second bus conductor having first and second branches, a first electric discharge device energized from said source and a four-pole relay controlled thereby, one pair of poles of said relay interposed into said second branch of said bus conductor, a fifth electric discharge device and means connecting the first branch of said second bus conductor to the cathode thereof and means including a time-constant circuit connecting the anode thereof with said first bus conductor, a sixth electric discharge device and means connecting the cathode thereof with said first bus conductor, means connecting the anode of said fifth electric discharge device to the control electrode of said sixth electric discharge device, means connecting the anode of said sixth electric discharge device to the control electrode of said first electric discharge device and other means including a time-constant circuit connecting the anode of said sixth electric discharge device to said second bus conductor, of a network interposed between and connected with said foregoing named electric discharge devices, comprising: a second electric discharge device having first and second control electrodes and means including the winding of a relay connecting the anode of said second electric discharge device to said first bus conductor; means connecting the cathode of said second electric discharge device to said second branch of said second bus conductor, means including a time-constant circuit connecting the first control electrode of said second electric discharge device to said first branch of said second bus conductor and a conductor including a resistor of relatively high value connecting the cathode of said second electric discharge device with said first bus conductor; a third electric discharge device having first and second control electrodes, and means including a time-constant circuit connecting the anode of said third electric discharge device with the first bus conductor and means connecting the cathode thereof to the first branch of said second bus conductor and means including a resistor connecting the control electrode thereof to said first branch of said second bus conductor; a capacitor and means connecting said first control electrode of said third electric discharge device through said capacitor to the anode of said second electric discharge device; a fourth electric discharge device and means connecting its cathode to said first bus conductor means including a time-constant circuit connecting the anode of said fourth electric discharge device to said second branch of said second bus conductor and means connecting the control electrode of said fourth electric discharge device to the anode of said third electric discharge device; means connecting the anode of said fourth electric discharge device also to the second control electrodes of each of said second and third electric discharge devices and means connecting the anode of said fourth electric discharge device to the control electrode of said fifth electric discharge device.

13. In a timing control including a plurality of electric valves, each having an anode, a cathode and a control electrode and including a load to be timably energized and de-energized and an output conductor connectible to means to be controlled which means are responsive to energization and de-energization of said controlling conductor, and the energization of said load and of said last named means being also timable with respect to each other, the combination: a source of alternating potential; means including a first valve energized from said source controlling the application of potential to the remainder of the device; a second valve having first and second control electrodes and means including said load connecting the anode of said second valve to that first side of said source; means connecting the cathode of said second valve to a second side of said source and means controlled by said first valve controllably energizing the control electrode of said second valve; a third valve having first and second control electrodes, means including a time-constant circuit connecting its anode to the first side of said source and means connecting its cathode to the second side of said source; a capacitor and means connecting the anode of said second valve through said capacitor to the first control electrode of said third valve, a resistor and means connecting said last named control electrode through said resistor to the cathode of said third valve; a fourth valve and means connecting its cathode to the first side of said source, a time-constant circuit and means connecting the anode of said fourth valve through said time-constant circuit to the second side of said source; means connecting the anode of said fourth valve to the second control electrode of said second valve and to said output conductor.

14. The combination claimed in claim 5 including also: a seventh electric discharge device, means including a time-constant circuit connecting the anode thereof to said first bus conductor and means connecting the cathode thereof to said second bus conductor, means connecting the control electrode thereof to the control electrode of said second electric discharge device; an eighth electric discharge device, means connecting the cathode thereof to the first bus conductor, means connecting the control electrode thereof to the anode of said seventh electric discharge device; a transformer, means connecting the primary winding thereof between the first and second bus conductors, means connecting one side of the secondary winding thereof to the anode of the eighth electric discharge device and means including a time-constant circuit connecting the other side of the said secondary winding to the first bus conductor; a ninth electric discharge device having two control electrodes, means connecting the cathode thereof to the first bus conductor, means connecting one control electrode to a point between said last named time-constant circuit and said last named end of said secondary winding, means connecting the other control electrode thereof to the control electrode of said fourth electric discharge device and means including a time-constant circuit connecting the anode thereof to said second bus conductor; means including one branch of a switch connecting said last named anode to both the second control electrode of the third electric discharge device and to the control electrode of said fifth electric discharge device, the other branch of said switch being interposed into the connection between said last named control electrodes and the anode of said fourth electric discharge device whereby said switch in one position will connect said last named control electrodes to said last named anode and in its other position will connect said last named control electrodes to the anode of said ninth electric discharge device.

15. Apparatus defined in claim 5 comprising a second control electrode in said fifth electric discharge device, a two-pole switch and means connecting said second electrode through said switch in one position thereof with the anode of said sixth electric discharge device and in another position of said switch with the cathode of said fifth electric discharge device.

16. In a timing control means, including a plurality of gas filled electric discharge devices, each having a cathode, an anode and a control electrode, the combination with means connectible to a source of alternating potential including first and second bus conductors alternately energized by said source in opposite polarity, and said second bus conductor having first and second branches, a first electric discharge device energized from said source and a four-pole relay controlled thereby, one pair of poles of said relay interposed into said second branch of said bus conductor, a fifth electric discharge device and means connecting the first branch of said second bus conductor to the cathode thereof and means including a time-constant circuit connecting the anode thereof with said first bus conductor, a sixth electric discharge device and means connecting the cathode thereof with said first bus conductor, means connecting the anode of said fifth electric discharge device to the control electrode of said sixth electric discharge device, means connecting the anode of said sixth electric discharge device to the control electrode of said first electric discharge device and other means including a time-constant circuit connecting the anode of said sixth electric discharge device to said second bus conductor, of a network interposed between and connected with said foregoing named electric discharge devices, comprising: a second electric discharge device having first and second control electrodes and means including the winding of a relay connecting the anode of said second electric discharge device to said first bus conductor; means connecting the cathode of said second electric discharge device to said second branch of said second bus conductor, means including a time-constant circuit connecting the first control electrode of said second electric discharge device to said first branch of said second bus conductor and a conductor including a resistor of relatively high value connecting the cathode of said second electric discharge device with said first bus conductor; a third electric discharge device having first and second control electrodes, and means including a time-constant circuit connecting the anode of said third electric discharge device with the first bus conductor and means connecting the cathode thereof to the first branch of said second bus conductor and means including a resistor connecting the control electrode thereof to said first branch of said second bus conductor; a capacitor and means connecting said first control electrode of said third electric discharge device through said capacitor to the anode of said second electric discharge device; a fourth electric discharge device and means connecting its cathode to said first bus conductor means including a time-constant circuit connecting the anode of said fourth electric discharge device to said second branch of said second bus conductor and means connecting the control electrode of said fourth electric discharge device to the anode of said third electric discharge device; means connecting the anode of said fourth electric discharge device to the second control electrode of the second electric discharge device; a seventh electric discharge device, means including a time-constant circuit connecting the anode thereof to said first bus conductor and means connecting the cathode thereof to said second bus conductor, means connecting the control electrode thereof to the control electrode of said second electric discharge device; an eighth electric discharge device, means connecting the cathode thereof to the first bus conductor, means connecting the control electrode thereof to the anode of said seventh electric discharge device; a transformer, means connecting the primary winding thereof between the first and second conductors, means connecting one side of the secondary winding thereof to the anode of the eighth electric discharge device and means including a time-constant circuit connecting the other side of the said secondary winding to the first bus conductor; a ninth electric discharge device having two control electrodes, means connecting the cathode thereof to the first bus conductor, means connecting one control electrode to a point between said last named time-constant circuit and said last named end of said secondary winding, means connecting the other control electrode thereof to the control electrode of said fourth electric discharge device and means including a time-constant circuit connecting the anode thereof to said second bus conductor; means connecting the anode of the ninth electric discharge device to the second control electrode of the third electric discharge device and to the control electrode of said fifth electric discharge device.

17. In combination with a sequence timer, a thyratron having an anode, first and second grids and a cathode; means energizing said anode and said cathode; means including a time constant circuit connecting one of said grids to said cathode; means including a resistor connecting the other of said grids directly to said cathode and means including a capacitor and another thyratron also connecting said other grid to the cathode circuit of said first named thyratron; means including a resistance of relatively high value connecting the anode and cathode of said last named thyratron and means connecting to the grid of said last named thyratron for controlling its conductivity.

18. The combination claimed in claim 5 including also in series a rectifier and a time-constant circuit, means connecting one end of said time-constant circuit to the first bus conductor, means connecting the other end of said time-constant circuit to the negative side of said rectifier, means connecting the positive side of said rectifier to said second bus conductor; a further electric discharge device having two control electrodes; means connecting the cathode of said electric discharge device to the first bus conductor and means including another time-constant circuit connecting the anode of said electric discharge device to said second bus conductor; means connecting one control electrode to said series circuit between said time-constant circuit and said rectifier; means connecting the other of said control electrodes to the second control electrode of said fourth electric discharge device and means connecting the anode of said last-named electric discharge device to the second control electrode in said third electric discharge device and to said control electrode of said fifth electric discharge device; and means breaking the connection between said fourth electric discharge device and said second control electrode of said third electric discharge device and said control electrode of said fifth electric discharge device.

19. An electric timing device, the combination comprising: a transformer having a plurality of secondary windings, a pair of bus conductors energized in opposite polarity with respect to each other from respectively opposite ends of one of said secondary windings; a plurality of electric discharge devices and means connecting their respective anodes and cathodes to said bus conductor; means connecting the filament windings of one group of said electric discharge devices to one of said secondary windings and other means connecting the filament windings of another group of said electric discharge devices to another of said secondary windings, the energizing of the filament windings of said last-named group of said electric discharge devices being wholly independent of the energizing of the filament windings of said first-named group of said electric discharge devices.

20. Apparatus defined in claim 5 including a transformer having a plurality of secondary windings wherein one of said windings energizes said bus conductors, the filaments of one group of said electric discharge devices are connected to another of said secondary windings and the filaments of another group of said electric discharge devices are connected to a still further one of said secondary windings, the connections of the filaments of the said last-named group of electric discharge devices to said last-named secondary winding being wholly independent of the connection of the filaments of said first-named group of said electric discharge devices to said next preceding named secondary winding.

21. In electric timing control apparatus for connection to a source of alternating potential, the combination comprising: first and second bus conductors and means connectable to said source energizing said bus conductors in opposite alternating polarities; a first circuit including a first thyratron connected between said conductors, the anode of said first thyratron being connected to the first bus conductor and the cathode thereof being connected to the second bus conductor; a second circuit including a second thyratron and means providing a time-constant circuit connected in series between said conductors, said thyratron being in the same polarity with respect to said conductors as said first thyratron and said time-constant circuit being in the anode circuit of said second thyratron; a control electrode in said second thyratron, a capacitor and means connecting said control electrode through said capacitor to the anode of said first thyratron; switch means controlling conduction through said first thyratron; a resistor connecting the control electrode of said second thyratron to the cathode circuit thereof.

STUART C. ROCKAFELLOW.

REFERENCES CITED

The following references are of record in the file of this patent:

UNITED STATES PATENTS

| Number | Name | Date |
| --- | --- | --- |
| 2,306,237 | Wolfner | Dec. 22, 1942 |
| 2,313,918 | Brownlee | Mar. 16, 1943 |
| 2,313,943 | Jones | Mar. 16, 1943 |
| 2,337,905 | Livingston | Dec. 28, 1943 |
| 2,368,477 | Kinsman | Jan. 30, 1945 |
| 2,422,020 | Kingsmill | June 10, 1947 |
| 2,463,318 | Schneider | Mar. 1, 1949 |

Certificate of Correction

Patent No. 2,573,360                                                           October 30, 1951

STUART C. ROCKAFELLOW

It is hereby certified that error appears in the printed specification of the above numbered patent requiring correction as follows:

Column 14, line 22, for the claim reference numeral "12" read 5;

and that the said Letters Patent should be read as corrected above, so that the same may conform to the record of the case in the Patent Office.

Signed and sealed this 26th day of February, A. D. 1952.

[SEAL]

THOMAS F. MURPHY,
*Assistant Commissioner of Patents.*